(12) United States Patent
Avivi (10) Patent No.: US 10,465,918 B2
(45) Date of Patent: Nov. 5, 2019

(54) DOMESTIC WATER HEATING SYSTEM (71) Applicant: Netanel Avivi, Kfar Saba (IL)

(72) Inventor: Netanel Avivi, Kfar Saba (IL)

( * ) Notice: Subject to any disclaimer, the term of this patent is extended or adjusted under 35 U.S.C. 154(b) by 0 days.

(21) Appl. No.: 16/099,322

(22) PCT Filed: Jun. 14, 2017

(86) PCT No.: PCT/IL2017/050657
§ 371 (c)(1),
(2) Date: Nov. 6, 2018

(87) PCT Pub. No.: WO2018/055608
PCT Pub. Date: Mar. 29, 2018

(65) Prior Publication Data
US 2019/0203952 A1    Jul. 4, 2019

(30) Foreign Application Priority Data
Sep. 22, 2016 (IL) .......................... 247984

(51) Int. Cl.
| F24D 19/00 | (2006.01) |
| F24H 1/20 | (2006.01) |
| F22B 1/28 | (2006.01) |
| F28G 9/00 | (2006.01) |
| F22B 37/34 | (2006.01) |

(52) U.S. Cl.
CPC .......... *F24D 19/0092* (2013.01); *F22B 1/284* (2013.01); *F22B 37/34* (2013.01); *F24H 1/202* (2013.01); *F28G 9/00* (2013.01)

(58) Field of Classification Search
CPC ...... F24D 19/0092; F22B 1/284; F22B 37/34; F24H 1/202; F28G 9/00
USPC ........ 392/441–464; 122/91, 429, 14.3, 14.31
See application file for complete search history.

(56) References Cited

U.S. PATENT DOCUMENTS

| 6,295,411 B1 * | 9/2001 | Fastman | C02F 1/02 122/4 A |
| 6,510,782 B1 * | 1/2003 | Blaschke | A47J 31/58 220/567.3 |
| 2007/0169917 A1 * | 7/2007 | Bishop | F28G 9/00 165/80.4 |
| 2010/0105125 A1 * | 4/2010 | Haley, III | C12M 21/02 435/257.1 |
| 2012/0118246 A1 * | 5/2012 | Oberkorn | F04B 23/021 122/382 |

FOREIGN PATENT DOCUMENTS

| CN | 204853965 | 12/2015 | |
| WO | 2007119233 | 10/2007 | |
| WO | WO-2007119233 A2 * | 10/2007 | .............. C02F 5/025 |

* cited by examiner

*Primary Examiner* — Dana Ross
*Assistant Examiner* — Kuangyue Chen
(74) *Attorney, Agent, or Firm* — Haim M. Factor (57) ABSTRACT

The invention relates to a domestic water heating system, which comprises: (A) a main water tank; and (B) an accelerator having a sleeve, which in turn comprises a mechanism for flushing lime scale accumulated at the bottom of the internal hollow of the sleeve, said mechanism causes a flow of cold-water from a cold-water inlet, to said bottom of the internal hollow of the sleeve, and from there to the main tank via hollows in the sleeve.

17 Claims, 13 Drawing Sheets

DOMESTIC WATER HEATING SYSTEM

FIELD OF THE INVENTION

The present invention relates to the field of domestic water heating systems. More particularly, the invention relates to an arrangement in a domestic water heating system, which substantially reduces the accumulation of limescale within elements of the boiler.

BACKGROUND OF THE INVENTION

A common problem in domestic water heating systems (hereinafter also referred to as "boiler systems") is the accumulation of limescale, due to minerals, such as calcium and magnesium, that exist within the within the water. The term "Hard water" typically refers to water which contains a relatively high concentration of dissolved minerals, and such "hard water" is often used in relation to domestic water heating systems.

The presence of hard water in water tanks of domestic water heating system leaves precipitations, like calcium carbonate on the surface it is in contact with. Said calcium carbonate precipitation often builds up and can cause significant problems. For instance, water pipes diameter might be reduced; the shape of components might be distorted and heating elements become less efficient. As a result, in an environment of hard water, domestic water heating systems require relatively frequent maintenance which involves replacement of pipes, heating elements and other water components.

The accumulation of limescale increases as the temperature of the water changes repeatedly. Another cause for an increased accumulation of limescale is a lack of water flow. In still (i.e., non-flowing) water the minerals are free to sink down to the surface with no interference. In domestic water heating systems both conditions exist, since the water within the container are still most of the time, and flow is obtained only when a user opens a tap to consume hot water from the boiler. Obviously the second condition also applies each time the heater of a boiler is turned on where the water is heated to a relatively high temperature and then cools down to outdoor temperature.

Heating elements of domestic water heating systems are typically enclosed within a sleeve-shaped cover, which contributes to the efficiency of the system, since it creates a smaller-volume tank of water within the large tank, thus the water is heated faster and is ready for domestic use. A drawback of the use of such a cover is the fact that the encasing of the heating element within a sleeve substantially reduces the free flow of water, a reduction which in turn increases the formation of precipitation.

The accumulation of limescale around a heating element reduces the heat transfer from the element to the water, since the limescale somewhat insulates the heating element from the water. The reduction of the heat transfer leads to a higher consumption of electricity in order to reach a desired water temperature. Moreover, the heating element is more likely to be damaged in an environment of high precipitations, and it is also more likely that different components of domestic water heating systems will have to be replaced when the precipitation reaches a certain degree. The need for additional electric power and the need for frequent replacement of components is time consuming, not to mention financial expenses.

One solution available today for the accumulation of limescale involves the use of chemicals that soften hard water by changing their chemical composition. Such chemicals that are suitable for domestic use typically provide water that consist sodium or potassium instead of calcium and magnesium. This solution is problematic as in that case the softened water has high concentration of salt and it lacks the valuable minerals, namely calcium and magnesium. Water with high concentration of salt may be unsafe for domestic uses such as drinking, cooking, plant irrigation and so on. Moreover, the water flow through the sewerage system or the ground may cause contamination of water resources and damage to the environment. Other chemical solutions involve using phosphates, zinc, arsenic and other heavy metals. The most common method which is known in the prior art is the use of Phosphate Siliphos beans that in fact comprises the chemical formula of $P_2O_5$ phosphoric acid. This process replaces the minerals, and prevents the formation of limescale. However, new studies indicate unequivocally that the existence of arsenic in water causes abortion in pregnant women and is a significant factor for a cancer disease.

The prior art also suggested the use of a magnetic field for the removal of precipitations. Another prior art method suggests the creation of an electrical field, which is unsafe and requires massive maintenance.

In addition, according to the prior art, the inlet of cold-water to the boiler is typically located at the side of the sleeve ("accelerator"). The sleeve is designed to have an aperture to allow water to flow in. Nevertheless, once the sleeve is full of water and at times of heating, said aperture causes heat loss and decrease the efficiency of the heating.

Therefore, it is an object of the present invention to provide a system and method for decreasing the formation of precipitations in water heating systems, particularly in boilers.

It is another object of the invention to provide a system and a method that decreases the heat loss in domestic water heating systems.

Other objects and advantages of the invention will become apparent as the description proceeds.

SUMMARY OF THE INVENTION

The invention relates to a domestic water heating system, which comprises: (A) a main water tank; and (B) an accelerator having a sleeve, which in turn comprises a mechanism for flushing lime scale accumulated at the bottom of the internal hollow of the sleeve, said mechanism causes a flow of cold-water from a cold-water inlet, to said bottom of the internal hollow of the sleeve, and from there to the main tank via hollows in the sleeve.

In an embodiment of the invention, said flushing mechanism comprises: (a) a sinker connected to a valve which is positioned within said cold-water inlet, said cold-water inlet also having one or more holes at its upper portion; and (b) a cup attached to an upper portion of the sinker; wherein when there is no hot water consumption from the water tank the sinker and the valve are located at a lower position such that the valve blocks said one or more holes in the cold-water inlet, and when there is hot water consumption from the water tank the sinker is located at an upper position such that the valve opens said one or more holes at the cold-water inlet thereby to allow said flow of cold-water which flushes the lime scale.

In an embodiment of the invention, said flushing mechanism further comprises a dome which directs the flow of flushing cold-water to said hollows in the sleeve.

In an embodiment of the invention, said sleeve further comprises one or more holes that are open when the cup is down, and blocks when the cup is up, to allow water circulation during heating of the tank, but while there is no water consumption from the main tank.

The invention also relates to a domestic water heating system, comprising: (A) a main water tank; and (B) an accelerator which comprises: b.1. a cold-water tube; b.2. a perforated tube which is attached to the bottom of the water tank, said perforated tube having a top opening, and plurality of holes at a lower portion of its outer wall; b.3. a cup having a top opening; and b.4. a sinker having a cylinder which passes through the cold-water tube, through the top opening of the perforated tube, and through the top opening of the cup, said sinker having a bottom valve and a top stopper along said cylinder;

wherein, in a stationary state when there is no cold-water flow within the cold-water tube, the bottom valve is located within the cold-water tube, while upon consumption of hot water, a pressure due to a cold-water flow in the cold-water tube elevates the sinker, thereby to raise said cup due to contact with said top stopper, thereby also to open a passage from the interior of the cup into the main water tank, and to cause a flow of limescale-flushing cold-water from the cold-water tube and through the perforated tube holes to within the main water tank.

Preferably, the accelerator further comprising a sleeve, and wherein said cup opens or closes an opening between the bottom of the sleeve and the main tank.

Preferably, said accelerator is positioned on a stage.

Preferably, said accelerator further comprises a heating element and a thermostat, both penetrating to within the sleeve via holes at the top of the cup.

Preferably, the sleeve comprises a top opening for enabling passage of hot water to within the main tank.

Preferably, an inlet of said cold-water tube is located within said perforated tube.

The invention further relates to an accelerator for a domestic water heating system, comprising: (a) a cold-water tube; (b) a perforated tube which is attached to a bottom of a water tank, said perforated tube having a top opening, and plurality of holes at a lower portion of its outer wall; (c) a cup having a top opening; and (d) a sinker having a cylinder which passes through the cold-water tube, through the top opening of the perforated tube, and through the top opening of the cup, said sinker having a bottom valve and a top stopper along said cylinder; wherein, in a stationary state when there is no cold-water flow within the cold-water tube, the bottom valve is located within the cold-water tube, while upon consumption of hot water, a pressure due to a cold-water flow in the cold-water tube elevates the sinker, thereby to raise said cup due to contact with said top stopper, thereby also to open a passage from the interior of the cup into the main water tank, and to cause a flow of limescale-flushing cold-water from the cold-water tube and through the perforated tube holes to within the main water tank.

Preferably, the accelerator further comprising a sleeve, and wherein said cup opens or closes an opening between the bottom of the sleeve and the main tank.

Preferably, said accelerator is positioned on a stage.

Preferably, said accelerator further comprises a heating element and a thermostat, both penetrating to within the sleeve via holes at the top of the cup.

Preferably, the sleeve comprises a top opening for enabling passage of hot water to within the main tank.

Preferably, an inlet of said cold-water tube is located within said perforated tube.

The invention also relates to a method for cleaning limescale from essential elements of a domestic water heating system, which comprises: (a) providing within a sleeve of an accelerator of said water heating system a cup, said cup being located at a bottom of a water tank of the system; (b) providing elevating means for elevating the cup upon entry of cold-water into the tank; (c) providing means within said cup for directing, upon entry of cold-water into the tank, a cleaning flow of cold-water toward said essential elements for flushing limescale from their surroundings; and wherein, upon entry of cold-water into the tank, elevating said cup, thereby to cause the cold-water to flow toward said essential elements and from them toward a main section of the tank, thereby to flush limescale surrounding said essential elements toward the main section of the tank.

Preferably, said opening of the cup is caused by means of a pressure caused by said entry of cold-water into the tank.

Preferably, said opening of the cup is caused by means of a pressure caused by said entry of cold-water into the tank.

Preferably, said flushing flow of cold-water passes from an inlet of the cold-water, through holes in a perforated tube toward said essential elements, and from the essential elements toward the main section of the tank.

DETAILED DESCRIPTION OF THE INVENTION

The invention relates to a novel acceleration subsystem for a domestic water heating system, and a method for reducing the accumulation of limescale in a domestic water heating system (the term "accelerator" refers herein to the sleeve which is typically used to accelerate the heating of water, and to all the elements that are enclosed within said sleeve). The acceleration subsystem of the invention may either come within a new boiler, or it may replace the typical prior art accelerator in an existing boiler. The invention may also be used in various fields where boiler systems are typically used, such as: domestic uses, industrial and so on.

The invention provides a solution for the known problem of limescale accumulation. As will be elaborated, the invention utilizes the flow of cold-water within the boiler in order to clean up limescale accumulation. Said use of cold-water flow, which in any case exists, in conjunction with the structure of the present invention, cleans-up essential elements from limescale, while avoiding consumption of extra energy.

The limescale, which is heavier that the water, tends to accumulate mostly at the bottom of the accelerator, and when coming into contact with elements, such as the heating element and the wall of the accelerator, it tends to reduce the efficiency of the system.

FIGS. 1 to 7 show a first embodiment of the invention. FIG. 1A and FIG. 1B is a cross-sectional front view of an exemplary boiler system 101, according to an embodiment of the present invention. In the specific embodiment of FIGS. 1A and 1B, the boiler system 101 comprises a conventional water tank 102, and an accelerator unit 106, which is the main subject of the present invention. In the exemplary boiler system 101 of the invention, the cold-water inlet is positioned within the heating accelerator unit 106. Boiler System 101 further comprising a stage 103 designed to support the heating accelerator 106 at an elevated position (relative to as commonly used prior art accelerators) within the water tank 102. The object of this stage will be described in more details as the description proceeds.

Figure 2A:
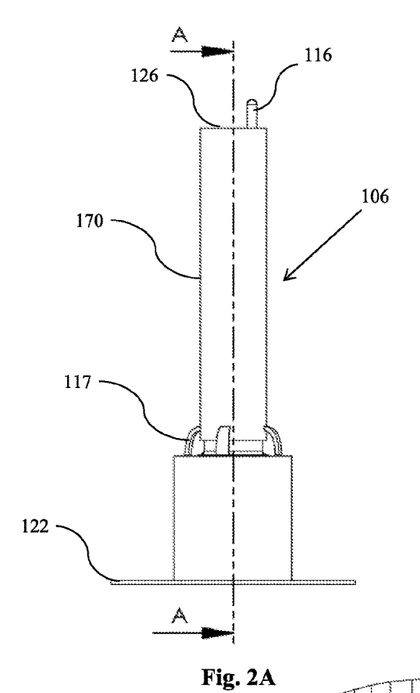
FIG. 2A is a front view of the heating accelerator device, without a flow of cold-water, according to one embodiment of the invention.

FIG. 2A is a front view of the heating accelerator 106. The accelerator 106 comprises a typical sleeve 170 as is known in the art. As is well known, sleeve 170 is used for the creation of a smaller-volume water container which enables heating the water to a desired temperature significantly faster compared to the duration required to heat the whole water tank 102 to a same temperature. Sleeve 170 has a hot water outlet 126 at the top of the sleeve, which outputs hot water to the top section of the water tank 102. The sleeve 170 is somewhat elevated from the stage 103 and attached to the stage by means of plurality of legs 117. The entire accelerator subsystem is secured (by any appropriate means such as: screws, clips etc.) and sealed to the base of the boiler 121 by means of accelerator base 122.

Figure 1A:
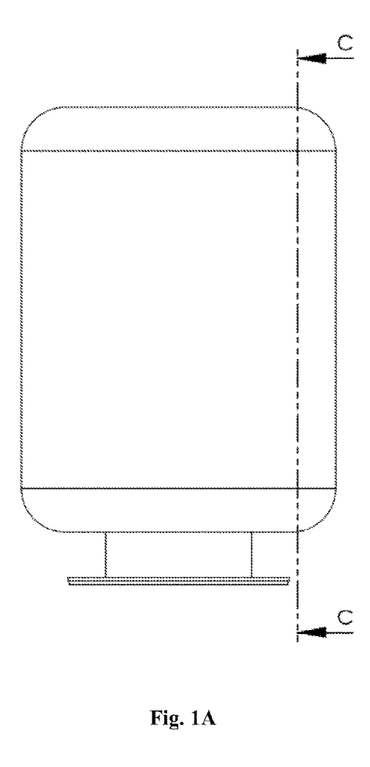
FIGS. 1A and 1B is a front view of the boiler system, according to one embodiment of the invention.
Figure 1B:
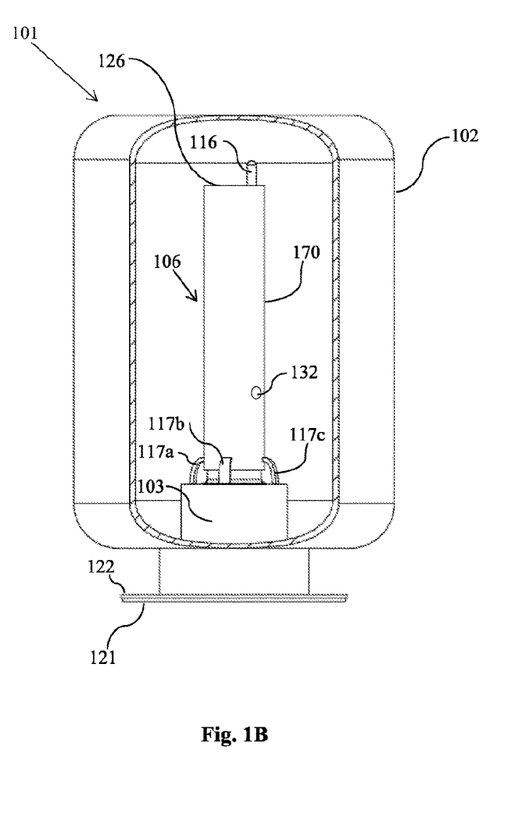
Figure 2B:
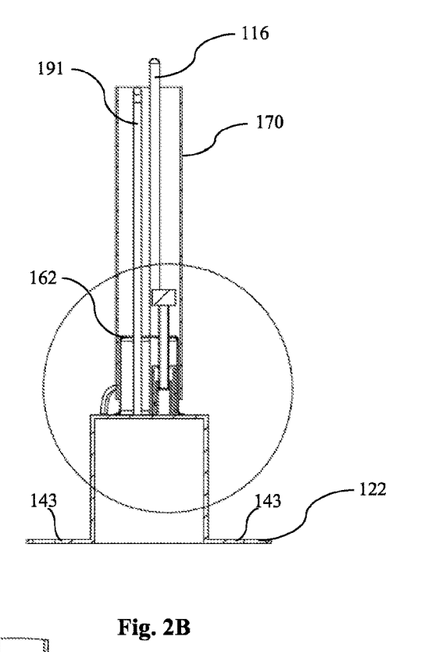
FIG. 2B is a cross-sectional view taken along the A-A axis of FIG. 2A.
Figure 2C:
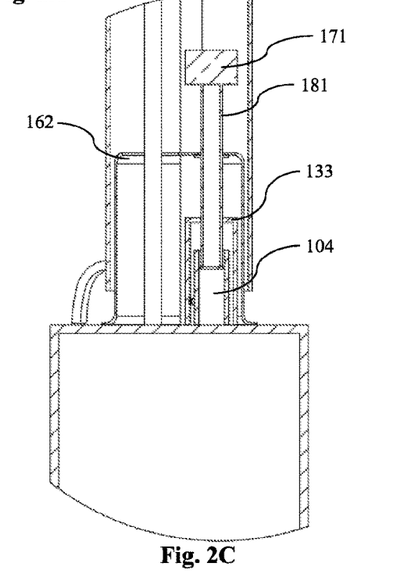
FIG. 2C is an enlarged view of the bottom section of the heating accelerator device of FIG. 2B.

FIG. 2B which is a cross-sectional view taken along the A-A axis of FIG. 2A, shows the internal structure of the accelerator 106. In order to facilitate the description, FIG. 2C provides an enlarged view of the main section of the heating accelerator unit 106. The unit comprises a cup 162 which opens (at an upper position) or closes (at its lower position) a bottom opening of sleeve 170 to the main water tank 102 in a manner which will be elaborated hereinafter. The accelerator further comprises a perforated tube 133, cold-water inlet 104 and sinker 181. FIG. 2C illustrates a situation where there is no consumption of hot water from the main tank 102. At this stage, the sinker is located at a lower position within the cold-water inlet 104, in view of the weight 171. Cup 162 is also positioned at its lower position, sealing the bottom opening 119 (shown in FIG. 4C) from the sleeve to the main water tank 102. If the heating element 191 (FIG. 3) is activated, the water within sleeve 170 is heated, and hot water flows through the outlet 126 into the main tank. When the heating element operates, while there is no consumption of hot water (and therefore cup 162 seals the transfer of water through opening 119), cold-water from the bottom of the main tank may enter into sleeve 170 via one or more openings 132 at the external wall of the sleeve (FIG. 1B). As noted, in the state shown in FIGS. 2B and 2C, there is no consumption of hot water from the main tank, therefore the cup is at its lower position, and the opening 119 is sealed.

Figure 3A:
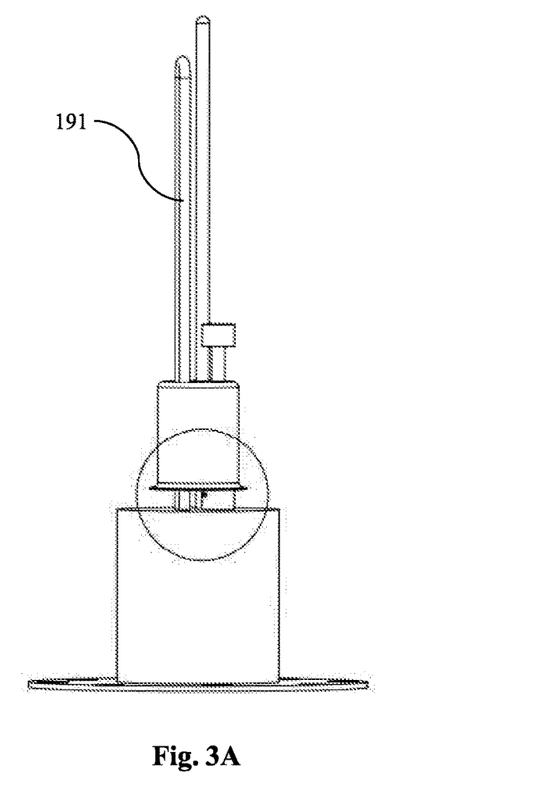
FIGS. 3A and 3B show in perspective view the heating accelerator device without the sleeve cover, according to one embodiment of the invention.
Figure 3B:
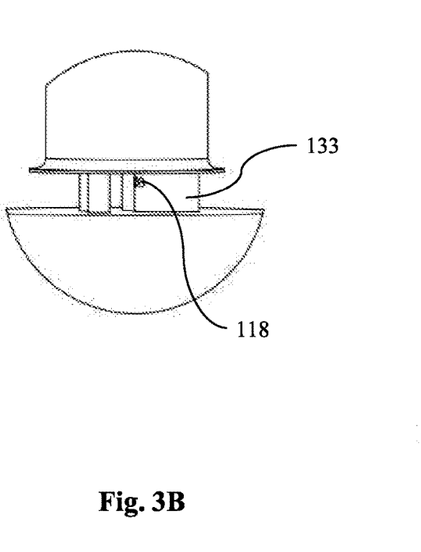
Figure 4A:
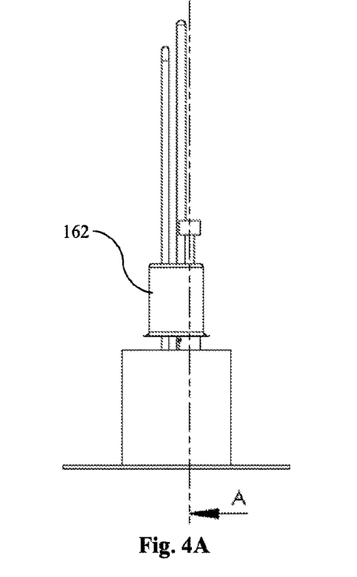
FIG. 4A is a front view of the heating accelerator device without its sleeve cover, according to one embodiment of the invention.
Figure 4B:
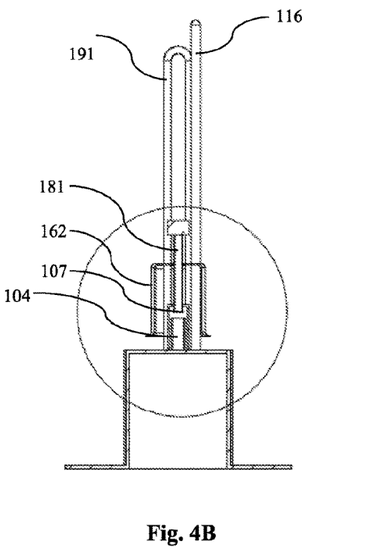
FIG. 4B is a cross-sectional view taken along the A-A axis of FIG. 4A.
Figure 4C:
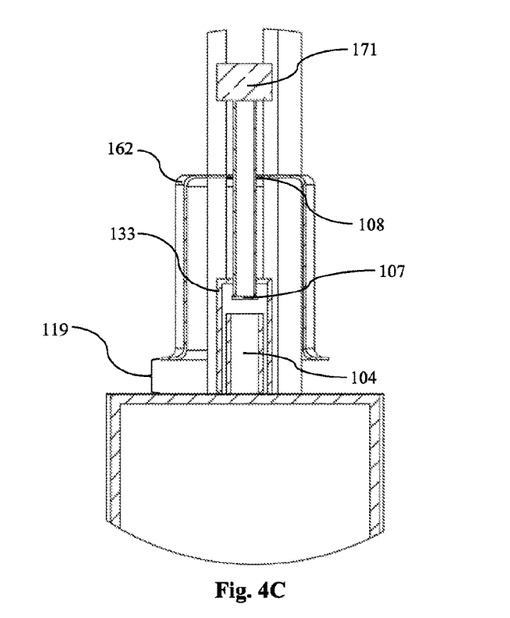
FIG. 4C is an enlarged view of the bottom section of the heating accelerator device of FIG. 4B.

As shown in FIG. 4C, during consumption of hot water from water tank 102, cold-water flows in via tube 104 into the sleeve 170, to refill the water tank 102. During such hot water consumption, the flow of cold-water into the tank applies a pressure force on a bottom valve 107 of sinker 181, causing it to elevate up to an elevated position as shown in FIG. 4C. The elevation of the sinker causes two effects: First, the elevation of the bottom valve fully opens the passage of water from inlet 104 to within a perforated tube 133, and second, a stopper 108 at the upper portion of the sinker comes into contact with the bottom surface of cup 162, pushing it somewhat upwards. The amount of the cup 162 elevation is defined by bottom valve 107, which is stopped by the upper wall of stationary perforated tube 133. At such a situation, water can flow through tube 104 into the gap between the inlet tube 104 and the perforated tube 133, and from said gap through the holes 318 (FIG. 7) at the bottom of the perforated tube 133 and opening 119 to within main tank 102. It should be noted that holes 318 at the lower portion of perforated tube 133 are directed towards the bottom of the heating element and in fact, this flow of cold-water into the main tank becomes possible in view of the raising of cup 108, which as said opens a bottom opening 119 (FIG. 4C) between the sleeve and the main tank. Said flow of cold-water flushes an accumulation of limescale from the bottom of the sleeve into the main tank, thereby it prevents builds-up of limescale on the heating element 191 and thermostat 116 (FIG. 3). The cup 162 remains at its elevated position as long as the cold-water flows into the sleeve 170, pushing the cup 162 upward by means stopper 108 of sinker 181. Once there is no water consumption from water tank 102, the cold-water flow through inlet 104 terminates, and sinker 181 sinks down due to its weight, also causing the cup 162 to go down into its "closed" state, thereby closing the passage 119 from the sleeve 170 into the main water tank 102. As shown, this structure of the accelerator unit of the invention flushes limescale away from the area where essential elements (such as the heating element 191, the thermostat 116, and the sleeve 170 are located. Therefore, even when still water exists around these elements, and limescale begins to accumulate at the bottom of the sleeve, this limescale accumulation will be flushed into the main tank 102 upon consumption of hot water from the water tank.

FIG. 4A-4C show perspective views of the heating accelerator unit 106 without the sleeve 170. Heating accelerator unit 106 is in a state when the cup is at its elevated state, enabling a flow of cold-water through the cold-water inlet tube 104, and perforated holes 318 into the main water tank 102. Heating accelerator 106 has a base 122 with holes 143 (FIG. 2B) for assembling the heating accelerator unit 106 to the top surface of stage 103 or to any other supporting element, such as the bottom of the main tank 102, by means of screws. Of course, any other appropriate means, other than screws, may be used to connect the heating accelerator unit 106 to the water tank 102.

FIG. 4A is a front view (similar to FIG. 3) of the heating acceleration unit 106 without the cover sleeve 170, during a water flow state. FIG. 4B is a cross-sectional view taken along the A-A axis. The Figure shows the heating element 191 and the thermostat 116, which are known components in the prior art. FIG. 4C is an enlarged view of the main section of the heating accelerator unit 106 shown in FIG. 4B, as mentioned, in a water flow state. As shown in FIG. 4C, the sinker 181 has a bottom valve 107 and a top stopper 108. As mentioned, upon consumption of hot water from tank 102, valve 107 is pushed up by the cold-water pressure (entering the tank) thereby to open the cold-water inlet tube 104, thereby allowing the water to flow to within the gap between inlet tube 104 and perforated tube 133. The purpose of the stopper 108 is to elevate the cup 162. It should be noted that FIG. 4C shows the valve 107 at its upper state, raised entirely out of the tube 104, thereby enabling flow of cold-water to within the perforated tube 133, and from there to within the main tank 102. Alternatively, in another embodiment, the tube 104 may include holes (not shown) at its upper section, while in its upper state the valve 107 is raised just above the holes, to allow the flow of cold-water via the holes to within the perforated tube 133, and from there, to within the main tank 102. Of course, in both of said cases,. when there is no flow of cold-water, the sinker is in its lower position, and valve 107 seals any flow of water to within the perforated tube 133, and from there into the main tank 102.

Figure 5:
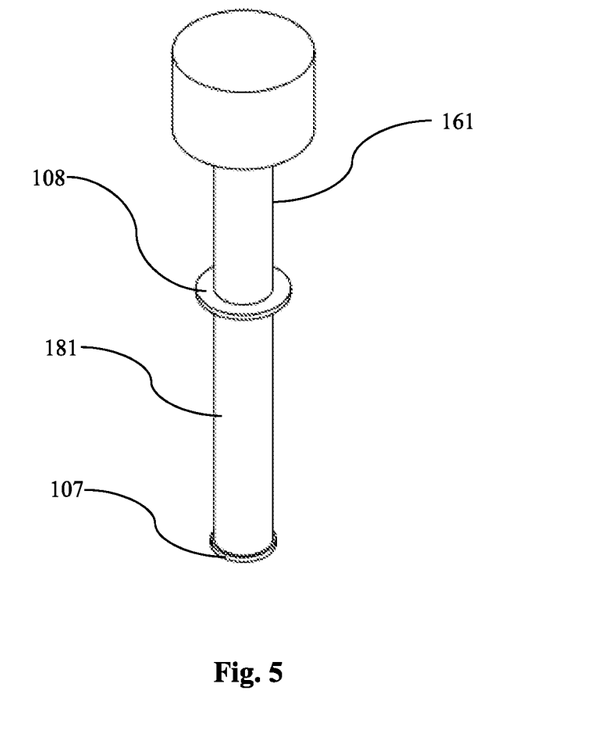
FIG. 5 is a perspective view of a sinker, according to one embodiment of the invention.
Figure 6:
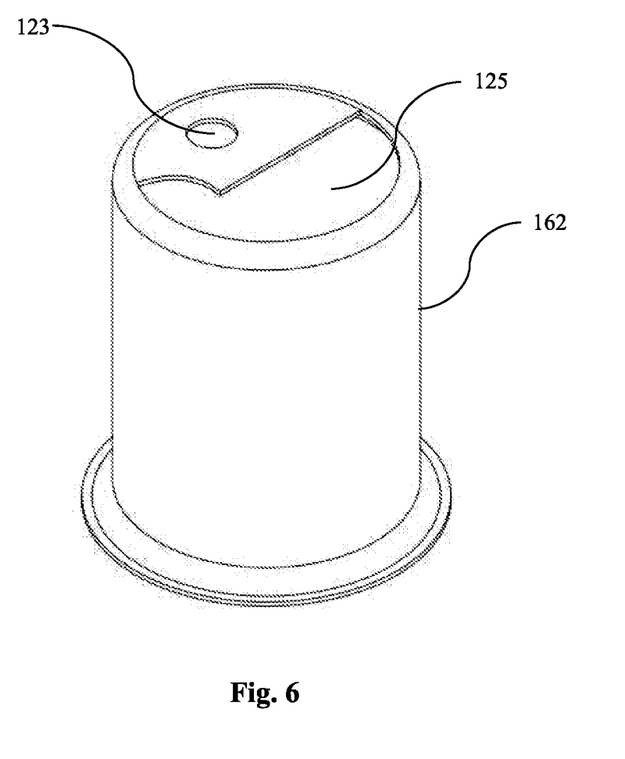
FIG. 6 is a perspective view of the cup, according to one embodiment of the invention.

FIG. 5 is a perspective view of sinker 181. As mentioned, sinker 181 comprises a bottom valve 107 and top stopper 108. Sinker 181 also comprises a cylinder 161 that passes through a top aperture 123 at cup 162 (see FIG. 6). FIG. 6 is a perspective view of cup 162. Cup 162 has a first aperture 123 for the cylinder of the sinker, and a second aperture 125 for the heating element 191 and the thermostat 116.

Figure 7:
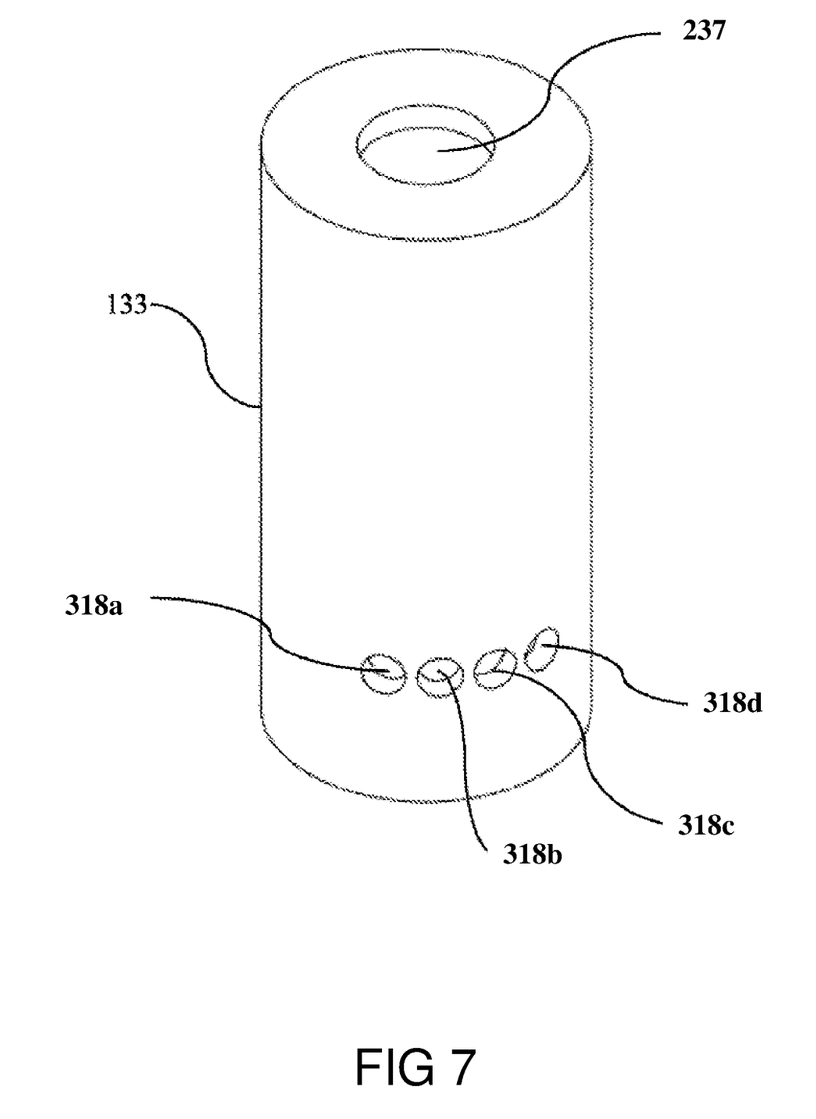
FIG. 7 is a perspective view of the perforated tube, according to one embodiment of the invention.

FIG. 7 is a perspective view of perforated tube 133. The perforated tube 133 has a top opening 237 for cylinder 161, however this opening has a smaller diameter than of valve 107, thereby to prevent the valve from passing through it. The diameter of perforated tube 133 is larger than the diameter of inlet tube 104, to allow it to accommodate inlet tube. As shown in FIG. 7, perforated tube 133 has four holes 318a-318d at its bottom to allow passage of cold-water towards the heating element and thermostat, thereby to flush limescale into the water tank 102. Of course, the number of holes 318, and their position and size may vary. In any case, the holes 318 are directed toward the heating element and the thermostat to enable removing limescale from them.

As shown, the structure of the heating accelerator unit 106 of the invention provides a solution to the known problem of limescale accumulation, by utilizing the existing water flow from the cold-water inlet to flush the limescale away from essential element (such as the heating element and the thermostat).

As is known, prior art accelerators have a side aperture at their sleeve for passage of cold-water from the bottom of the main tank 102 into the accelerator's sleeve. This cold-water pipe passes through the main tank, into the accelerator. This flow of cold-water results in a significant loss of energy. In the system of the present invention this loss of energy is eliminated, as the supply of the cold-water (by means of the cold-water pipe 104) is made directly to the accelerator, not via the main tank.

Figure 8:
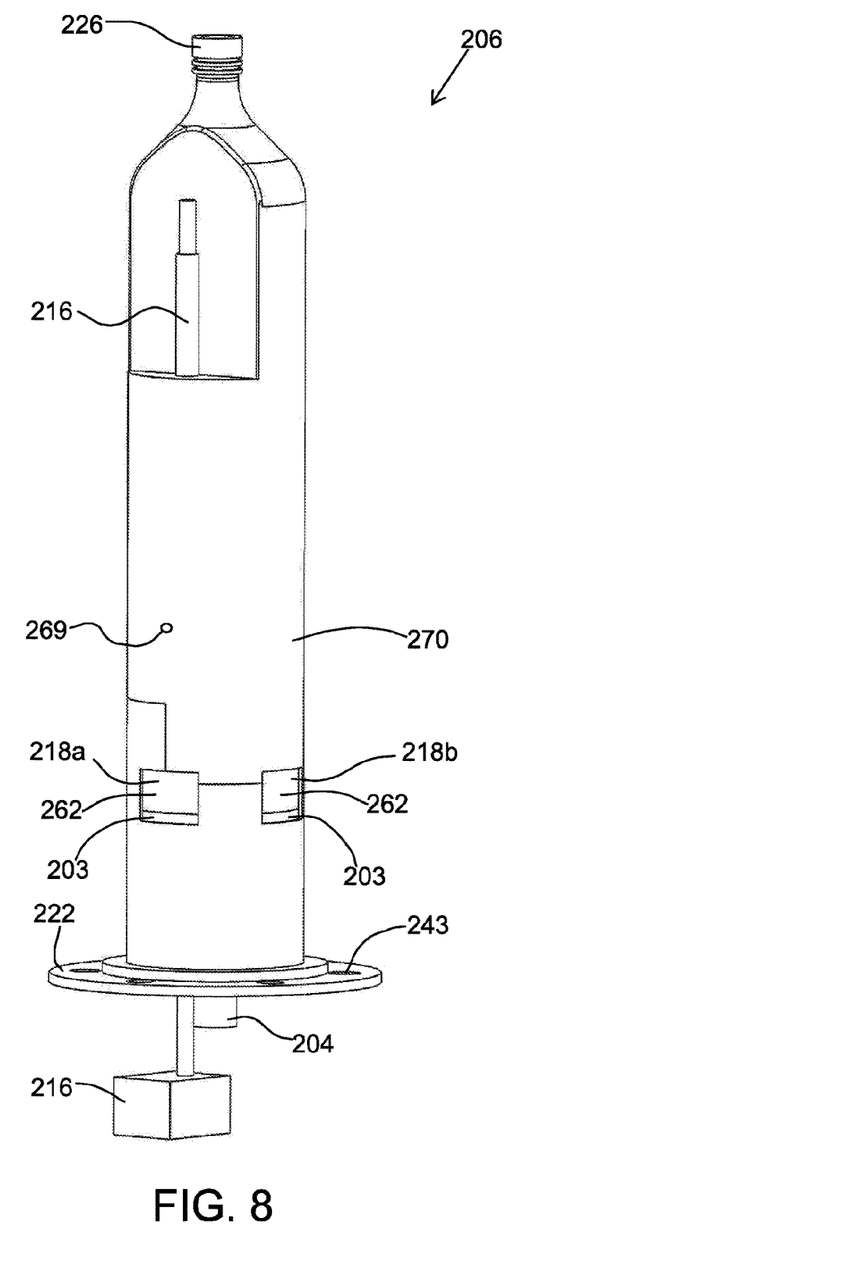
FIG. 8 shows the exterior of the accelerator according to a second embodiment of the invention.

FIGS. 8 - 13 show an accelerator 206 according to a second embodiment of present invention. For the sake of brevity, elements of the second embodiment having similar functionalities respectively to elements of the first embodiment have received similar indexes. FIG. 8 shows the exterior of accelerator 206 of the invention, fully assembled (but not yet mounted within the main tank). FIG. 8 shows the sleeve 270, thermostat 216, sleeve holes 218a, 218b, etc. (more holes may exist), inlet tube 204, and hot water outlet at the top of the accelerator. The figure also shows a cup 262 as seen via the holes 218 resting on stage 203 during a stationary state of the accelerator. Heating accelerator 206 has a base 222 with holes 243 for assembling the heating accelerator unit 206 to the top surface of a bottom of the main tank (not shown), by means of screws. Of course, any other appropriate means, other than screws, may be used to connect the heating accelerator unit 206 to the water tank. A sealing gasket is typically also used between base 222 and the main tank.

Figure 9:
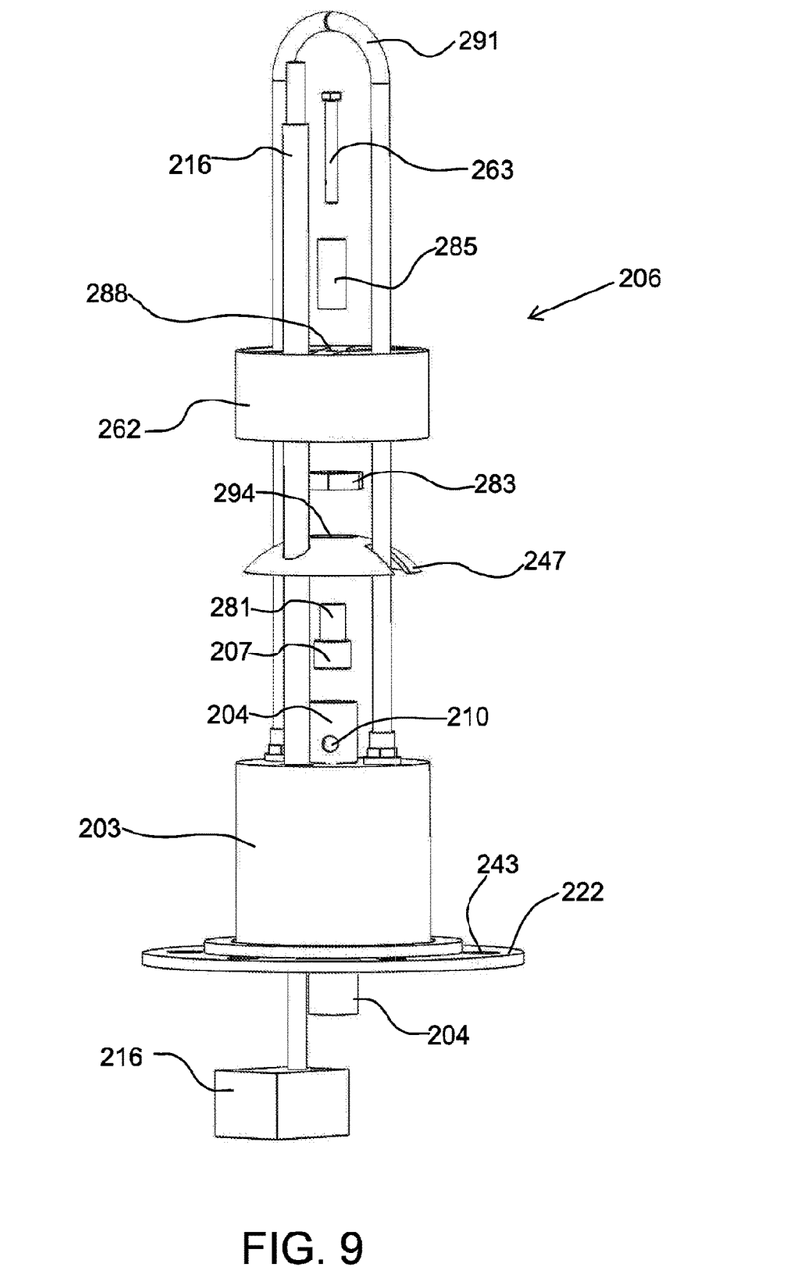
FIG. 9 is an exploded view of the main internal components of the accelerator of FIG. 8.

FIG. 9 is an exploded view of the main internal components of the accelerator 206 (that are hidden in the view of FIG. 8). The accelerator comprises stage 203, thermostat 216, heating element 291, inlet tube 204 having one or more peripheral holes 210, sinker 263 which is screwed at its lower portion to valve cylinder 281 (which in turn having at its bottom valve 207), dome 247, cup 262, nut 283, and spacer 285. Sinker 263 may have some weight (not shown), for example, at its top portion in order to ensure a proper operation.

Figure 10:
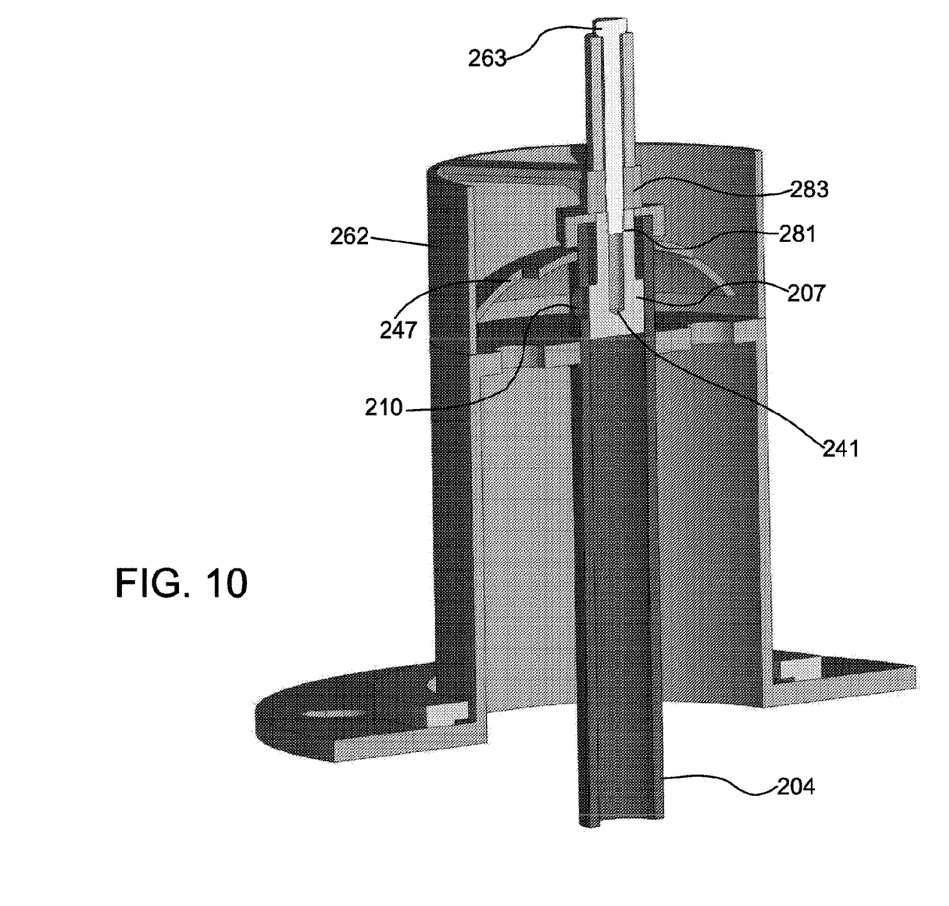
FIG. 10 is a cross sectional view showing the structure of the internal portion of the accelerator of FIG. 8.
Figure 11:
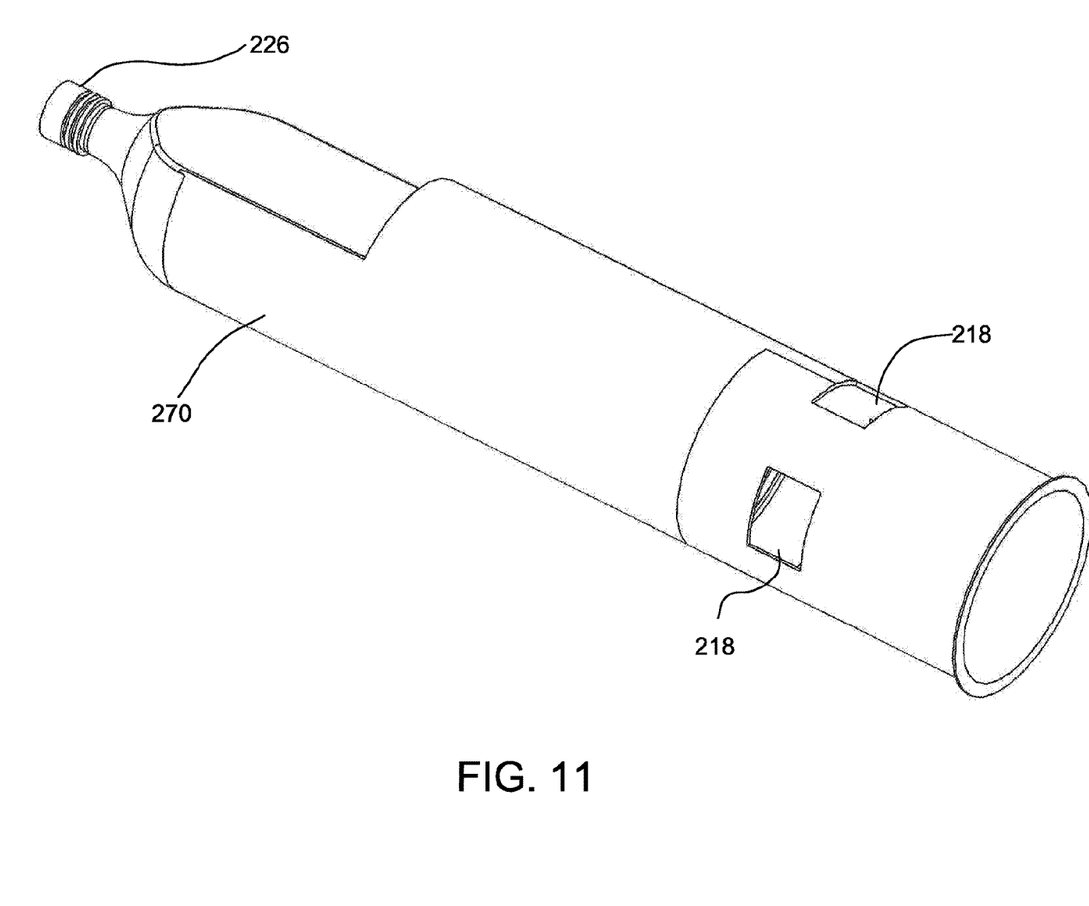
FIG. 11 shows the structure of the accelerator sleeve.
Figure 12:
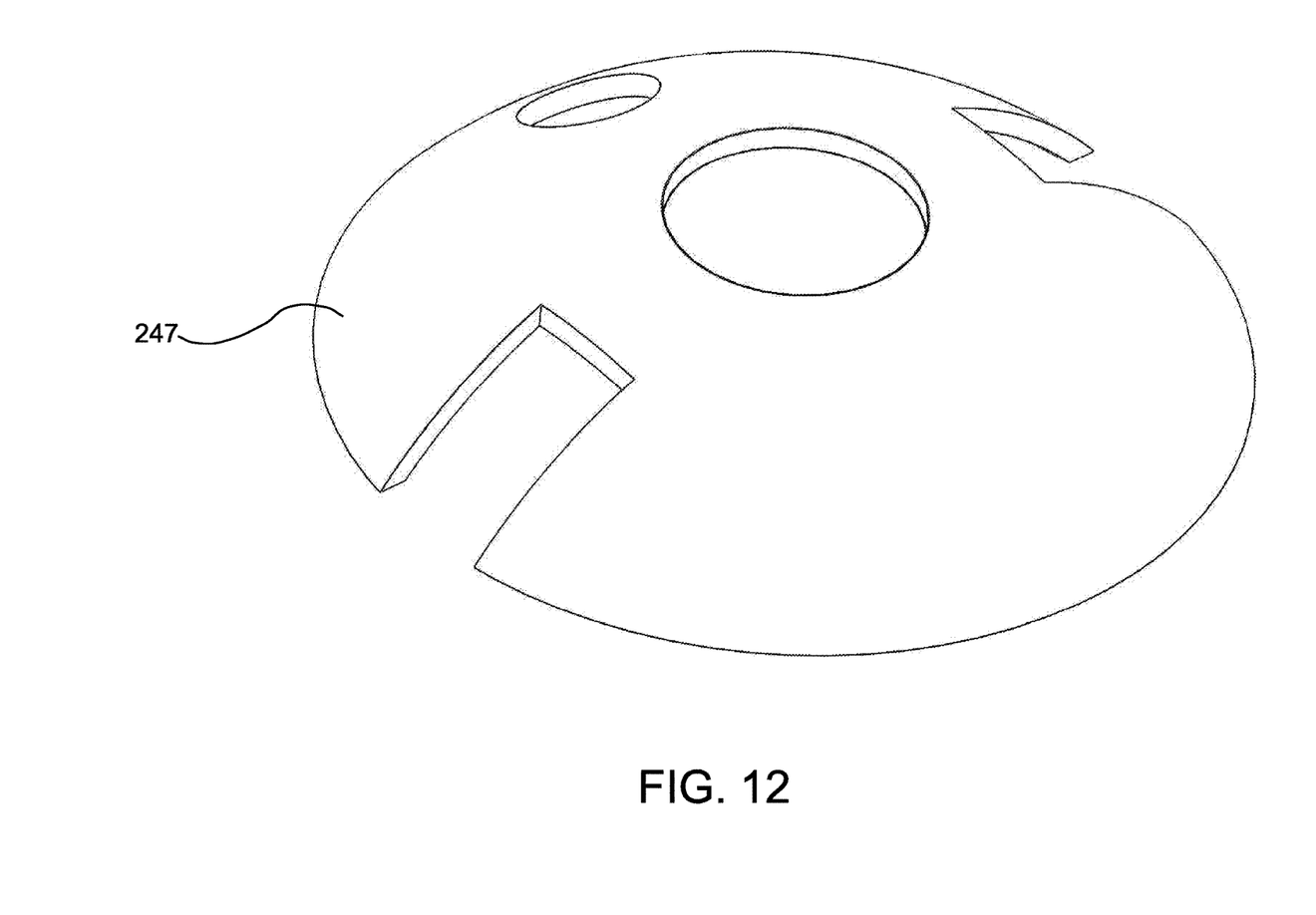
FIG. 12 shows the structure of the dome element to the accelerator.
Figure 13:
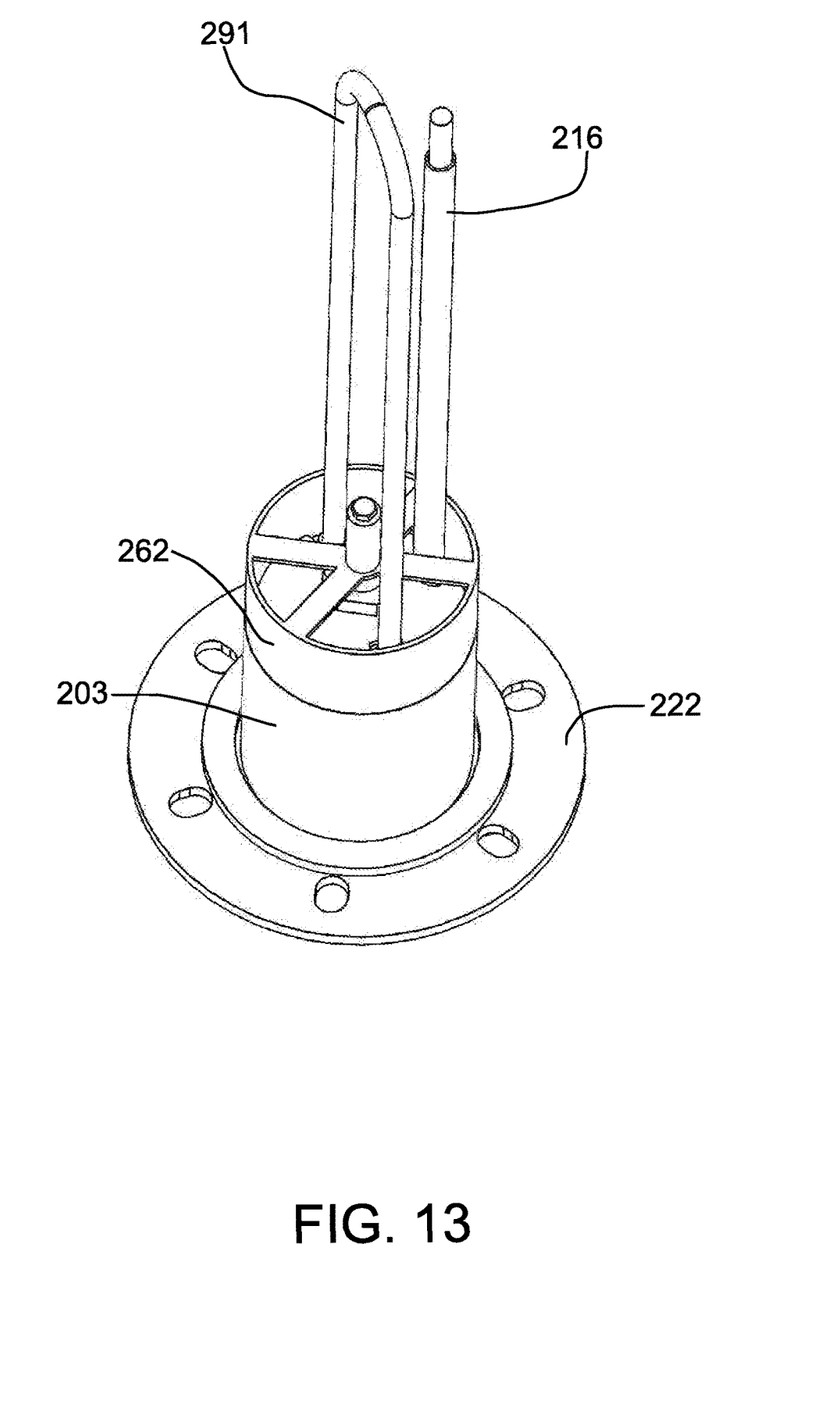
FIG. 13 shows the internal structure of the accelerator according to the second embodiment of the invention.

FIG. 10 is a cross sectional view showing the of structure of the internal portion of accelerator 206. Sinker 263 passes through spacer 285, the central hole 288 of cup 262, nut 283, and central hole 294 of dome 247, finally screwed within the bore of valve cylinder 281. In a stationary state, when there is no consumption of hot water from the system (and there is no flow of cold-water to the main tank via inlet tube 204), the sinker 263 is in its lower position due to gravity force, thereby the valve 207 blocks the hole 210 in tube 204. The cup 262, as well as the dome 247 (both being fixedly connected to sinker 263) are also at their lower position, therefore the cup 262 blocks the sleeve holes 218 (see FIG. 8), and there is no flow of water from within the cup, and via the sleeve holes 218 to the main tank. On the other hand, upon consumption of hot-water from the main tank, cold-water from within tube 204 apply an upward force on valve 207, causing it to move upward to its upward position above hole 210. This movement upward causes a similar upward movement of cup 262 and dome 247 to their upper position, thereby opening the sleeve holes 218. Upon this opening of the one or more holes 210, and holes 218, a flow of cold-water is created from water tube 204, via holes 210, and via holes 218 to within the main tank. In similarity to the first embodiment, this flow of cold-water flushes the limescale which is accumulated at the bottom of the internal hollow of the sleeve (near the thermostat and the heating element) to within the main tank. It should be noted that the dome is preferably arranged in such a manner that it blocks a flow of water from the hollow below its lower surface to the hollow above its upper surface. Sealings as are necessary should be provided. However, in some cases only a partial sealing by the dome may be provided.

In a stationary state (when there is no consumption of hot water from the main tank), and when the user turns on the heating switch, the heating element 291 begins to heat the water within the sleeve 270. A water circulation begins to flow from the main tank, via one or more holes 269 to within the internal hollow of the sleeve 270, and back to the main tank via output 226. It should be noted that the one or more holes 269 are open only during a stationary state, as while consumption of hot water from the tank, the cup 262, being in its upper state, blocks this hole theby preventing flow through it.

It should be noted herein that the embodiments given above are only examples, as for example, a similar mechanism for flushing may involve activation of the limescale flushing stream in an electrical manner.

All the above description has been provided for the purpose of illustration and is not meant to limit the invention in any way. The invention presents significant advantages over the existing art. For example, the use existing water flow to clean the problematic areas for limescale accumulation, create water movement and decrease heat loss.

The invention claimed is:

1. A domestic water heating system, comprising:
   a. a main water tank;
   b. an accelerator having a sleeve, which in turn comprises a flushing mechanism for flushing lime scale accumulated at the bottom of an internal hollow of the sleeve, said flushing mechanism causes a flow of cold-water from a cold-water inlet positioned within the accelerator to said bottom of the internal hollow of the sleeve, and from there to the main water tank via hollows in the sleeve; and
   c. wherein the flushing mechanism further comprises a sinker connected to a valve which is positioned within said cold-water inlet, said cold-water inlet also having one or more holes at an upper portion of the cold-water inlet; and
   d. a cup attached to an upper portion of the sinker;
   wherein when there is no hot water consumption from the main water tank, the sinker and the valve are located at a lower position such that the valve blocks said one or more holes in the cold-water inlet, and when there is hot water consumption from the main water tank, the sinker is located at an upper position such that the valve opens said one or more holes at the cold-water inlet thereby to allow said flow of cold-water which flushes the lime scale.

2. The domestic water heating system according to claim 1, wherein said sleeve further comprises one or more holes that are open when the cup is down, and blocks when the cup is up, to allow water circulation during heating of the main water tank, but while there is no water consumption from the main water tank.

3. The domestic water heating system according to claim 1, wherein said flushing mechanism comprises:
   a. a perforated tube which is attached to the bottom of the main water tank, said perforated tube having a top opening, and plurality of holes at a lower portion of its outer wall;
   b. a cup having a top opening; and
   c. the sinker having a cylinder which passes through the cold-water inlet, through the top opening of the perforated tube, and through the top opening of the cup, said sinker having the valve and a top stopper along said cylinder;
   wherein, in a stationary state when there is no cold-water flow within the cold-water inlet, the bottom valve is located within the cold-water inlet, while upon consumption of hot water, a pressure due to a cold-water flow in the cold-water inlet elevates the sinker, thereby to raise said cup due to contact with said top stopper, thereby also to open a passage from the interior of the cup into the main water tank, and to cause a flow of limescale-flushing cold-water from the cold-water inlet and through the perforated tube holes to within the main water tank.

4. The domestic water heating system according to claim 3, wherein said cup opens or closes an opening between the bottom of the sleeve and the main tank.

5. The domestic water heating system according to claim 3, wherein said cold-water inlet is located within said perforated tube.

6. The domestic water heating system according to claim 1, wherein said flushing mechanism is positioned on a stage.

7. The domestic water heating system according to claim 1, wherein said accelerator further comprises a heating element and a thermostat, both penetrating holes at the top of the cup.

8. The domestic water heating system according to claim 1, wherein the sleeve comprises a top opening for enabling passage of hot water to within the main tank.

9. An accelerator for a domestic water heating system, comprising:
   a. a cold-water tube;
   b. a perforated tube which is attached to a bottom of a water tank, said perforated tube having a top opening, and plurality of holes at a lower portion of its outer wall;
   a cup having a top opening; and
   c. a sinker having a cylinder which passes through the cold-water tube, through the top opening of the perforated tube, and through the top opening of the cup, said sinker having a bottom valve and a top stopper along said cylinder;
   wherein, in a stationary state when there is no cold-water flow within the cold-water tube, the bottom valve is located within the cold-water tube, while upon consumption of hot water, a pressure due to a cold-water flow in the cold-water tube elevates the sinker, thereby to raise said cup due to contact with said top stopper, thereby also to open a passage from the interior of the cup into the water tank, and to cause a flow of limescale-flushing cold-water from the cold-water tube and through the perforated tube holes to within the main water tank.

10. The accelerator according to claim 9, wherein the accelerator further comprising a sleeve, and wherein said cup opens or closes an opening between the bottom of the sleeve and the water tank.

11. The accelerator according to claim 10, wherein said accelerator further comprises a heating element and a thermostat, both penetrating to within the sleeve via holes at the top of the cup.

12. The accelerator according to claim 10, wherein the sleeve comprises a top opening for enabling passage of hot water to within the main tank.

13. The accelerator according to claim 9, wherein said accelerator is positioned on a stage.

14. The accelerator according to claim 9, wherein an inlet of said cold-water tube is located within said perforated tube.

15. A method for cleaning limescale from essential elements of the domestic water heating system of claim 1, which comprises:
   a. configuring within a sleeve of an accelerator of said domestic water heating system a cup, said cup being located at a bottom of the main water tank of the domestic water heating system;
   b. providing elevating means for elevating the cup upon entry of cold-water into the main water tank;

c. providing means within said cup for directing, upon entry of cold-water into the main water tank, a flushing flow of cold-water toward said essential elements for flushing limescale from their surroundings; and wherein, upon entry of cold-water into the main water tank, elevating said cup, thereby to cause a flushing flow of cold-water toward said essential elements and from them toward a main section of the main water tank, thereby to flush limescale surrounding said essential elements toward the main section of the main water tank.

16. The method according to claim 15, wherein an opening of the cup is caused by means of a pressure caused by said entry of cold-water into the main water tank.

17. The method according to claim 15, wherein said flushing flow of cold-water passes from the cold-water inlet, through holes in a perforated tube, which is attached to the bottom of the main water tank, said perforated tube having a top opening, and plurality of holes at a lower portion of its outer wall, the flow of cold-water directed toward said essential elements, and from the essential elements toward the main section of the main water tank.

* * * * *